United States Patent
Kim

(10) Patent No.: US 12,515,739 B2
(45) Date of Patent: Jan. 6, 2026

(54) FOUR-WHEEL INDEPENDENT STEERING APPARATUS AND CONTROL METHOD THEREOF

(71) Applicant: HYUNDAI MOBIS CO., LTD., Seoul (KR)

(72) Inventor: Tae Hong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 259 days.

(21) Appl. No.: 18/110,106

(22) Filed: Feb. 15, 2023

(65) Prior Publication Data

US 2024/0124059 A1  Apr. 18, 2024

(30) Foreign Application Priority Data

Oct. 17, 2022 (KR) .................... 10-2022-0133263

(51) Int. Cl.
 B62D 7/15 (2006.01)
 B62D 6/00 (2006.01)
 B62D 15/02 (2006.01)

(52) U.S. Cl.
 CPC ............ B62D 7/159 (2013.01); B62D 6/00 (2013.01); B62D 15/021 (2013.01)

(58) Field of Classification Search
 CPC ......... B62D 7/159; B62D 6/00; B62D 15/021
 See application file for complete search history.

(56) References Cited

U.S. PATENT DOCUMENTS

| | | | | |
|---|---|---|---|---|
| 4,657,102 A | * | 4/1987 | Kanazawa ........... | B62D 7/1545 180/415 |
| 2020/0391788 A1 | * | 12/2020 | Kim ....................... | G01L 5/221 |
| 2022/0144336 A1 | * | 5/2022 | Kim ....................... | G05B 13/024 |

FOREIGN PATENT DOCUMENTS

| | | |
|---|---|---|
| DE | 10 2017 108 692 A1 | 10/2017 |
| DE | 10 2017 119 605 A1 | 3/2018 |
| DE | 10 2021 130 555 A1 | 8/2022 |
| JP | 2004-98732 A | 4/2004 |
| JP | 2014-24448 A | 2/2014 |
| KR | 10-2373870 B1 | 3/2022 |
| KR | 10-2022-0055947 A | 5/2022 |

OTHER PUBLICATIONS

German Office Action Issued on Jan. 10, 2025, in counterpart German Patent Application No. 102023102207.5 (4 Pages in English, 4 Pages in German).
Korean Office Action Issued on Aug. 26, 2025, in counterpart Korean Patent Application No. 10-2022-0133263 (6 Pages in English, 6 Pages in Korean).

* cited by examiner

*Primary Examiner* — Andrew J Cromer
(74) *Attorney, Agent, or Firm* — NSIP Law

(57) ABSTRACT

Disclosed herein is a four-wheel independent steering apparatus. The apparatus includes a load estimator configured to receive, from a sensor disposed in a steering system, a value corresponding to a sensing by the sensor, and calculate an amount of load based on the value received from the sensor. The apparatus also includes a processor configured to receive, from an autonomous driving controller that is an upper-level controller, a steering angle reference, calculate an output value for allowing an actual steering angle to track the steering angle reference, based on the steering angle reference, the value from the sensor, and the amount of the load from the load estimator, and output the output value to the steering system.

10 Claims, 4 Drawing Sheets

(a)

(b)

FOUR-WHEEL INDEPENDENT STEERING APPARATUS AND CONTROL METHOD THEREOF

CROSS-REFERENCE TO RELATED APPLICATION

This application claims the benefit under 35 USC § 119(a) of Korean Patent Application No. 10-2022-0133263, filed on Oct. 17, 2022, in the Korean Intellectual Property Office, the entire disclosure of which is incorporated herein by reference for all purposes.

BACKGROUND

1. Field

The present disclosure relates to a four-wheel independent steering apparatus having a structure by which the four-wheel independent steering apparatus may perform stable driving control by estimating and compensating for external load while a vehicle is driving, and a control method thereof.

2. Description of Related Art

In general, a four-wheel independent steering apparatus of a vehicle (e.g., an autonomous vehicle) performs position control (i.e., position control for independent steering of four wheels) by receiving a position control reference from an autonomous driving module. To properly perform the position control, it is required to perform suitable compensation output control over accidental external load or friction.

A typical controller (e.g., a proportional-integral-differential (PID) controller) of a typically used steering device does not have a compensation output control function for external load or friction.

Thus, a typical controller without a compensation output control function for external load or friction has limited control performance.

Accordingly, to use the typical controller in an autonomous vehicle, a function (or an algorithm or a device) capable of performing a compensation output control function for external load or friction is required to be separately added.

In addition, it is required to add a function (or an algorithm or a device) enabling a steering device to continuously perform position control by the compensation output control for external load or friction even in a case in which a current sensor has failed.

SUMMARY

In one general aspect, a four-wheel independent steering apparatus is provided. The apparatus includes a load estimator configured to receive, from a sensor disposed in a steering system, a value corresponding to a sensing by the sensor, and calculate an amount of load based on the value received from the sensor. The apparatus also includes a processor configured to receive, from an autonomous driving controller that is an upper-level controller, a steering angle reference, calculate an output value for allowing an actual steering angle to track the steering angle reference, based on the steering angle reference, the value from the sensor, and the amount of the load from the load estimator, and output the output value to the steering system.

The load estimator may be further configured to estimate a steering angular speed on which a steering angular speed error is based and a current value on which a current error is based.

The value provided to the load estimator by the sensor comprises the actual steering angle, an actual steering angular speed, and an actual current of the steering system.

The processor may be configured to set a steering angular speed reference value using an actual steering angular speed provided by the sensor or a steering angular speed estimated by the load estimator to calculate the output value.

The processor may be configured to set a current reference value using an actual current value provided by the sensor or a current value estimated by the load estimator to calculate the output value.

The processor may be configured to set a steering angular speed reference value and a current reference value by which an error between a reference value and an actual value is 0.

The processor may be configured to calculate the output value by applying:

$$u = -K_1 * \text{Theta\_error} - K_2 * \text{Omega\_error} - K_3 * \text{Current\_error} + \text{Omega\_ref} * Kb + \text{Current\_ref} * R + \text{Current\_ref} * L,$$

where $K_t$ denotes a motor constant, R denotes an electrical resistance, L denotes inductance, and Kb denotes a torque constant due to counter electromotive force.

In another general aspect, a control method of a four-wheel independent steering apparatus may include calculating, by a load estimator, an estimated amount of load detected and provided by a sensor disposed in a steering system, and calculating, and receiving, by a processor, from an autonomous driving controller that is an upper-level controller, a steering angle reference. The method may also include calculating, by the processor, an output value for allowing an actual steering angle to track the steering angle reference, based on the steering angle reference, the detected value, and a value input from the load estimator, and outputting the output value to the steering system.

In response to determining that the detected value is provided, the method may include estimating, by the load estimator, a steering angular speed on which a steering angular speed error is reflected and a current value on which a current error is reflected.

The value provided to the load estimator by the sensor may include the actual steering angle, an actual steering angular speed, and an actual current of the steering system.

The method may include setting, by the processor, a steering angular speed reference value using an actual steering angular speed provided by the sensor or a steering angular speed estimated by the load estimator to calculate the output value to be output to the steering system.

The method may include setting, by the processor, a current reference value using an actual current value provided by the sensor or a current value estimated by the load estimator to calculate the output value to be output to the steering system.

The setting the steering angular speed reference value or the current reference value may further include setting the steering angular speed reference value and the current reference value by which an error between a reference value and an actual value is 0.

The method may further include calculating the output value to be output to the steering system by applying:

$$u = -K_1 * \text{Theta\_error} - K_2 * \text{Omega\_error} - K_3 * \text{Current\_error} + \text{Omega\_ref} * Kb + \text{Current\_ref} * R + \text{Current\_ref} * L,$$

where $K_t$ denotes a motor constant, R denotes an electrical resistance, L denotes inductance, and Kb denotes a torque constant due to counter electromotive force.

Figure 1:
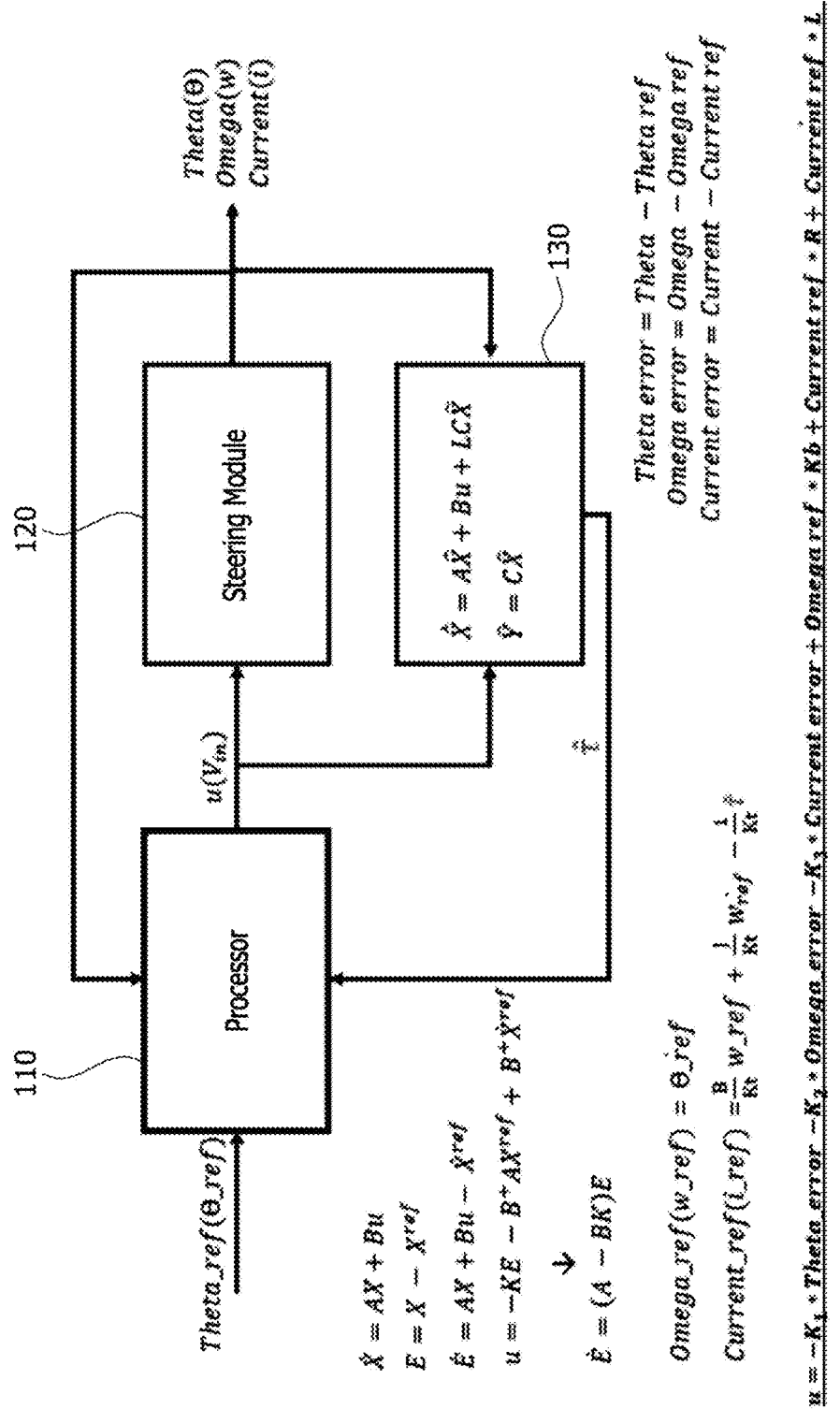
FIG. 1 is an example diagram illustrating a schematic configuration of a four-wheel independent steering apparatus according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is adequately disclosed, and a person with ordinary skill in the art can fully understand the scope of the present disclosure. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, a four-wheel independent steering apparatus and a control method thereof according to an embodiment of the present disclosure will be described below with reference to the accompanying drawings.

FIG. 1 is an example diagram illustrating a schematic configuration of a four-wheel independent steering apparatus according to an embodiment of the present disclosure.

As illustrated in FIG. 1, the four-wheel independent steering apparatus according to the present embodiment includes a processor 110, a steering module (i.e., a four-wheel independent steering module) 120, and a load estimation module 130.

The load estimation module 130 receives an actual steering angle θ, an actual steering angular speed w, and an actual current value i fed back (for example, provided) from a sensor module (not shown) disposed in the steering module 120, estimates a steering angular speed on which a steering angular speed error (or w error) is reflected and a current value on which a current error is reflected, and calculates an estimated amount of load τ̂.

Here, the sensor module (not shown) detects the actual steering angle θ, the actual steering angular speed w, and the actual current i.

The processor 110 receives a steering angle reference θ_ref (or a steering angle instruction) from an autonomous driving module (not shown) that is an upper-level controller, receives the actual steering angle θ detected by the sensor module (not shown) disposed in the steering module 120, and performs position control for allowing the actual steering angle θ to track the steering angle reference θ_ref.

In addition, the processor 110 sets a steering angular speed reference ω_ref using the actual steering angular speed w detected by the sensor module (not shown) disposed in the steering module 120 or the steering angular speed estimated by the load estimation module 130.

In addition, the processor 110 sets a current reference i_ref using the actual current value i detected by the sensor module (not shown) disposed in the steering module 120 or a current value estimated by the load estimation module 130.

In addition, the processor 110 may calculate an output value u(V$_{in}$), on which the estimated amount of load $\hat{\tau}$ output by the load estimation module 130 is reflected, as in following Equation 1 and input the output value u(V$_{in}$), on which the estimated amount of load $\hat{\tau}$ is reflected, to the steering module 120.

$$u = -K_1*\text{Theta\_error} - K_2*\text{Omega\_error} - K_3*\text{Current\_error} + \text{Omega\_ref}*Kb + \text{Current\_ref}*R + \text{Current\_ref}*L \quad \text{[Equation 1]}$$

Here, K$_t$ indicates a motor constant, J indicates a moment of inertia, B indicates a damping coefficient, R indicates an electrical resistance, L indicates inductance, and Kb indicates a torque constant due to counter electromotive force.

That is, the processor 110 sets the steering angular speed reference ω_ref and the current reference i_ref, by which an error between an intended reference value (i.e., a reference value) and an actual value is 0, using a value (e.g., the estimated amount of load $\hat{\tau}$ an estimated steering angular speed, or an estimated current value) output by the load estimation module 130, and calculates the input value u(V$_{in}$) of the steering module 120 by applying the steering angular speed reference ω_ref and the current reference i_ref set above to Equation 1.

For reference, Equation 1 is set to multiply each state error (e.g., a theta_error, an omega_error, or a current_error) with each value of motor constants K$_1$ to K$_3$ and add a compensation output, in which system model characteristics of the steering module 120 are considered, to a reference value (e.g., ω_ref, i_ref) of each state variable.

Here, values of the motor constants K$_1$ to K$_3$ are derived by considering an intended bandwidth, sensitivity, or the like through tuning or characteristics of a system model.

The steering module 120 controls an actual vehicle (i.e., a motor) using the applied value u(V$_{in}$).

The load estimation module 130 calculates and outputs the estimated amount of load $\hat{\tau}$ by receiving a control current of the vehicle (i.e., the motor) applied to the steering module 120 by the processor 110 or a voltage value u(V$_{in}$) corresponding to the control current and receiving the actual steering angle θ, the actual steering angular speed ω, and the actual current i detected by the sensor module (not shown).

Figure 2:
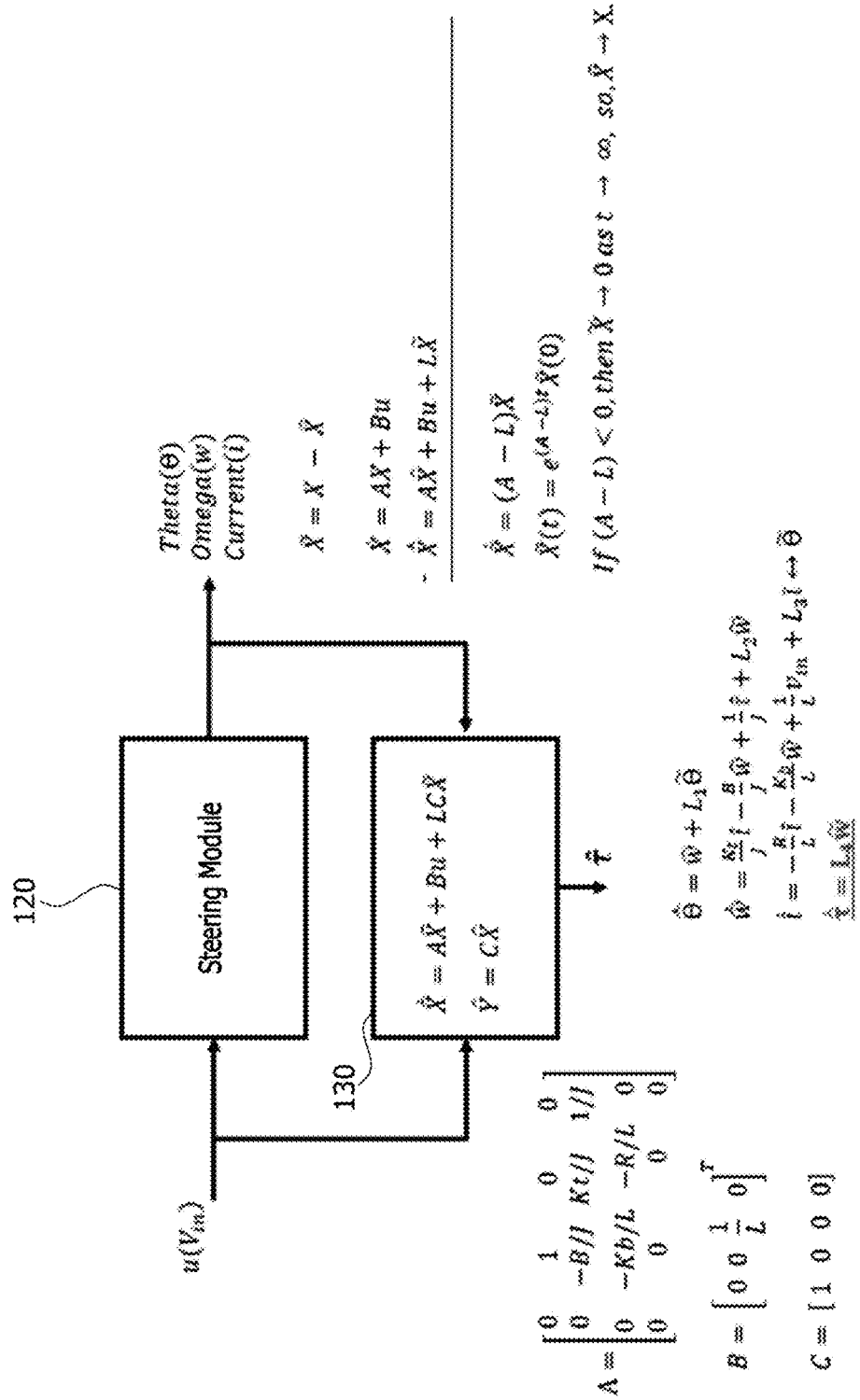
FIG. 2 is an example diagram illustrating equations applied to a load estimation model used in calculation of an estimated amount of load by the load estimation module in FIG. 1.

A method of calculating the estimated amount of load by the load estimation module 130 is more specifically illustrated in FIG. 2.

Here, a sign "Λ" in the estimated amount of load $\hat{\tau}$ indicates an estimated value.

FIG. 2 is an example diagram illustrating equations applied to a load estimation model used in calculation of the estimated amount of load $\hat{\tau}$ by the load estimation module in FIG. 1

However, it should be understood that the equation illustrated in FIG. 2 is only to show that calculation of the estimated amount of load $\hat{\tau}$ is possible but not intended to limit the calculation of the estimated amount of load $\hat{\tau}$.

Referring to FIG. 2, the load estimation model according to the present disclosure is expressed as Ẋ=AX+Bu and Y=CX, where A indicates a state parameter, B indicates an input parameter, u indicates an input, X indicates a state variable, Y indicates an output, C indicates the relationship between the state variable and the output.

Here, in FIG. 2, a sign "^" (hat) indicates an estimated value, a sign "~" (tilde) indicates a difference (i.e., an error) between an actual value and a reference value.

In addition, L$_1$ to L$_4$ are gain values for estimating respective state variables. The gain values L$_1$ to L$_4$ are adjusted by tuning or determined according to characteristics of a model controlled by considering an intended bandwidth or tracking performance (e.g., the sensitivity of a reaction to external disturbance or noise).

Furthermore, K$_t$ indicates a motor constant, J indicates a moment of inertia, B indicates a damping coefficient, R indicates an electrical resistance, L indicates an inductance, and Kb indicates a torque constant due to counter electromotive force.

Thus, the estimated amount of load $\hat{\tau}$ may be calculated by calculating the equation illustrated in FIG. 2 or may be calculated using another equation.

Here, a value of the estimated amount of load $\hat{\tau}$ calculated by the load estimation module 130 directly indicates external load (or external force) or friction. As illustrated in FIG. 2, a differentiated value $\dot{\hat{\tau}}=L_4\overline{w}$ may be derived by differentiating the estimated amount of load $\hat{\tau}$, and an estimated value of the external load (or external force) or friction may be derived by integrating the differentiated value $\dot{\hat{\tau}}$.

In addition, when a current sensor (not shown) of the sensor module (not shown) has failed, the load estimation module 130 substitutes a current error into a steering angle from equation $$\dot{\hat{\imath}} = -\frac{R}{L}\hat{\imath} - \frac{K_b}{L}\hat{w} + \frac{1}{L}v_\text{in} + L_3\, \tilde{\imath} \leftrightarrow \tilde{\theta}$$

in FIG. 2. Here, when the gain L$_3$ is applied as a value previously tuned or calculated according to the steering angle, it is possible to estimate the current value. As a result, position control is possible even in a case in which the current sensor has failed.

That is, the present embodiment may estimate external load or friction as described above and continuously perform position control (i.e., steering control) even in a case in which the current sensor has failed.

As described above, according to the present embodiment, the processor 110 may estimate external load or friction by receiving a steering angle, a steering angular speed, and a current value fed back by the sensor module (not shown) of the steering module 120 or estimate a steering angular speed, a current value, and load and friction values by receiving only a steering angle fed back by the sensor module (not shown) of the steering module 120. In addition, according to the present embodiment, even in a case in which the current sensor has failed, when a steering angle and a steering angular speed are fed back, a current value, external load (or external force), or friction value may be estimated.

That is, according to the present embodiment, as illustrated in FIG. 1, even in a case in which the current sensor (not shown) has failed, the processor 110 estimates a steering angular speed, a current value, and load and friction values by only receiving a steering angle fed back thereto and calculates the voltage value u(V$_{in}$) corresponding to a control current of a vehicle (i.e., a motor) to be applied to the steering module 120 on the basis of preset Equation 1.

Accordingly, even in a case in which the current sensor (not shown) has failed, the steering module 120 may stably perform position control on the basis of the voltage value u(V$_{in}$) corresponding to the control current of a vehicle (i.e., a motor) calculated by the processor 110.

Figure 3:
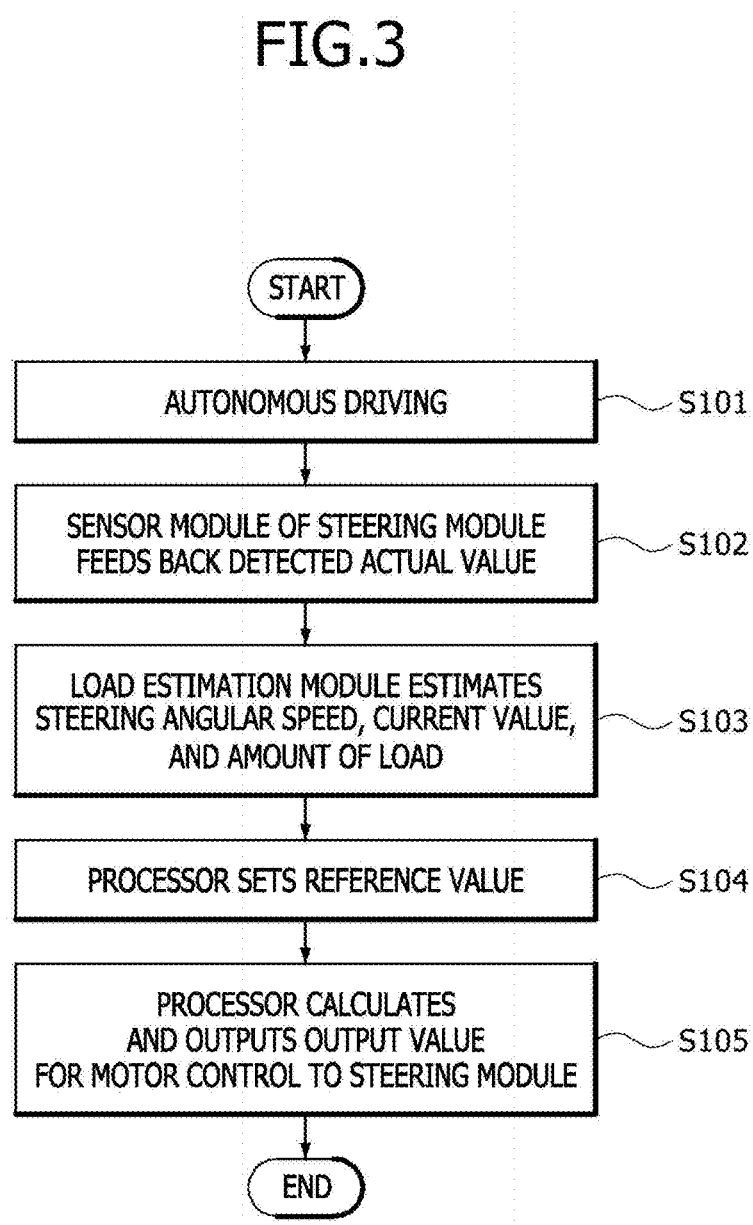
FIG. 3 is a flowchart illustrating a control method of a four-wheel independent steering apparatus according to an embodiment of the present disclosure.

FIG. 3 is a flowchart illustrating a control method of a four-wheel independent steering apparatus according to an embodiment of the present disclosure.

Referring to FIG. 3, when a vehicle is driving autonomously in S101, an actual steering angle θ, an actual steering angular speed w, and an actual current i detected by the sensor module (not shown) disposed in the steering module 120 are fed back to the load estimation module 130 in S102.

The load estimation module 130 calculates an estimated amount of load $\hat{\tau}$ by estimating an amount of load and estimates a steering angular speed and a current value in the process of calculating the estimated amount of load $\hat{\tau}$ in S103.

The processor 110 sets a steering angular speed reference ω_ref and a current reference i_ref using a preset equation, on the basis of a steering angle reference θ_ref input by the autonomous driving module (not shown) that is an upper-level controller, a value fed back by the sensor module (not shown), and a value estimated by the load estimation module 130 in S104.

In addition, the processor 110 calculates a control current of a vehicle (i.e., a motor) to be applied to the steering module 120 or a voltage value $u(V_{in})$ corresponding to the control current from the value (e.g., a steering angle error, a steering angular speed error, a current error, a steering angular speed reference, or a current reference) estimated by the load estimation module 130 using the present equation such as Equation 1 and outputs the calculated control current or voltage value $u(V_{in})$ to the steering module 120 in S105.

Accordingly, even in a case in which the current sensor (not shown) has failed, the steering module 120 may stably perform position control on the basis of the control current of a vehicle (i.e., a motor) calculated by compensating for external load (or external force) or friction by the processor 110 or the voltage value $u(V_{in})$ corresponding to the control current.

Figure 4:
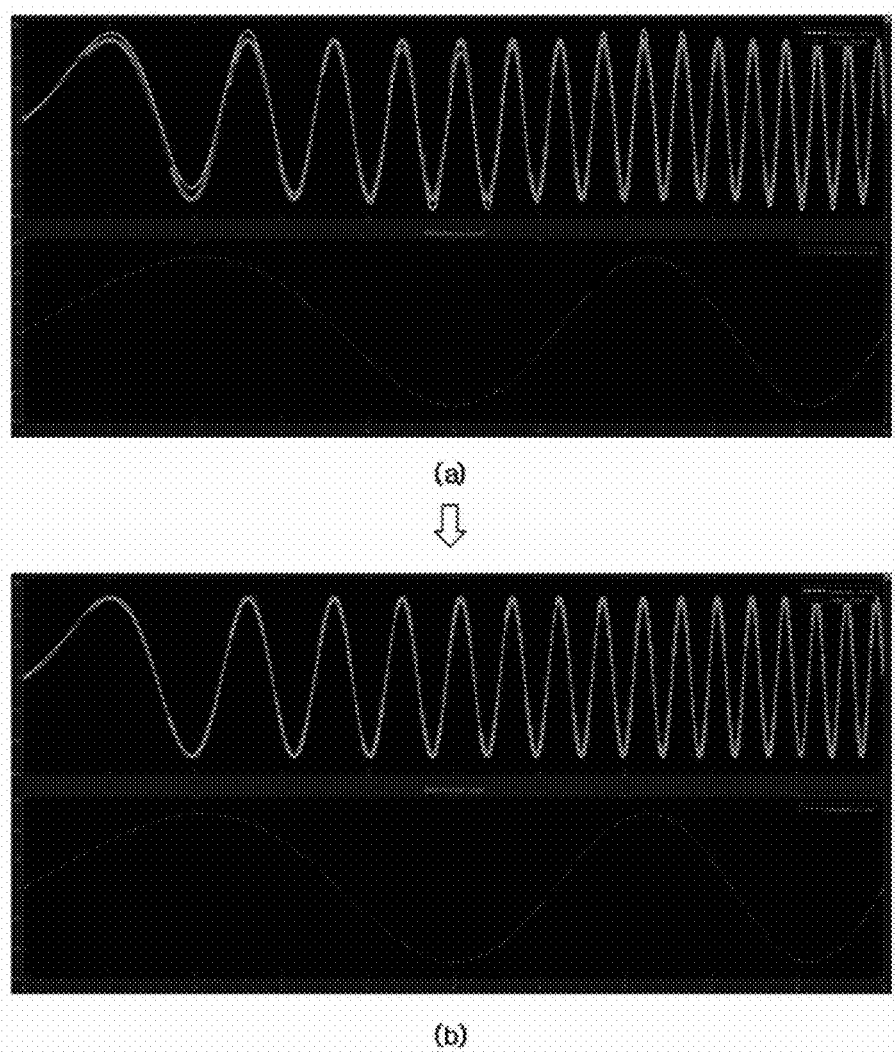
FIG. 4 is an example diagram illustrating status graphs before and after application of the control method of a four-wheel independent steering apparatus according to an embodiment of the present disclosure.

FIG. 4 is an example diagram illustrating status graphs before and after application of the control method of a four-wheel independent steering apparatus according to an embodiment of the present disclosure.

Referring to (a) of FIG. 4, when external load (or external force) is applied (as marked yellow in the lower block) before the control method of a four-wheel independent steering apparatus according to an embodiment of the present disclosure is applied, it can be appreciated that an actual steering angle (marked in yellow in the upper block) extends above or below an instructed steering angle (marked in blue in the upper block) according to a direction in which the external load acts.

Referring to (b) of FIG. 4, when external load (or external force) is applied (as marked in yellow in the lower block) after the control method of a four-wheel independent steering apparatus according to an embodiment of the present disclosure is applied, it can be appreciated that an actual steering angle (marked in yellow in the upper block) is identical with, while not extending above or below, an instructed steering angle (marked in blue in the upper block) irrespective of a direction in which the external load acts.

As described above, according to the present embodiment, no matter how much external force (or load), friction, or the like changes, optimized position control may be performed, thereby maximizing route tracking performance of the four-wheel independent steering apparatus. Even in a case in which the current sensor has failed, position control may be continuously performed, thereby improving stability.

Examples of the present disclosure provide stable driving control by estimating and compensating for accidental external load (or external force) or friction while a vehicle is driving, and a control method thereof.

In addition, the present disclosure allows to estimate and compensate for external load (or external force) or friction even in a case in which a current sensor of a steering device has failed.

In addition, according to an aspect of the present disclosure, it is possible to estimate and compensate for load or friction by receiving a steering angle, a steering angular speed, and a current value fed back or a steering angular speed, a current value, and load and friction by only receiving a steering angle fed back, thereby allowing stable driving control of a four-wheel independent steering apparatus to performed.

A four-wheel independent steering apparatus having a structure by which the four-wheel independent steering apparatus may perform stable driving control by estimating and compensating for accidental external load (or external force) or friction while a vehicle is driving, and a control method thereof.

In addition, even though accidental external load is applied during autonomous driving, compensation may be performed in response to the applied external load, whereby more robust position control of autonomous driving may be performed.

Various embodiments are directed to a four-wheel independent steering apparatus having a structure by which the four-wheel independent steering apparatus may perform stable driving control by estimating and compensating for accidental external load (or external force) or friction while a vehicle is driving, and a control method thereof.

In addition, an electric steering device of an autonomous vehicle is required to be robust to noise or external disturbance in steering angle position control and continuously maintain steering force even in a case in which the current sensor or the like has failed. Accordingly, the present embodiment may optimize position control performance of the four-wheel independent steering apparatus of a vehicle in response to external load, thereby allowing autonomous driving to be continuously performed without turning of the steering wheel even in a case in which, for example, external load or friction has occurred or a driver accidentally manipulates the steering wheel during autonomous driving.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A four-wheel independent steering apparatus comprising:
one or more processors configured to:
receive, from a sensor disposed in a steering system in a vehicle, an actual steering angle and an actual steering angular speed of the steering system;
calculate an amount of load based on the actual steering angle and the actual steering angular speed of the steering system;
receive, from an autonomous driving controller that is an upper-level controller, a steering angle reference;
perform position control of the steering module to control the actual steering angle to track the steering angle reference based on the amount of load; and
calculate a control current of the vehicle to be applied to the steering module or a voltage value corresponding to the control current from the amount of load and output the calculated control current or voltage value to the steering module,
wherein, when the sensor fails to provide the actual steering angle and the actual steering angular speed of the steering system, the one or more processors are configured to estimate the actual steering angle and the actual steering angular speed of the steering system by applying a gain to a previously calculated actual steering angle and actual steering angular speed of the steering system, and to calculate the amount of load based on the estimated actual steering angle and the estimated actual steering angular speed.

2. The four-wheel independent steering apparatus according to claim 1, wherein the one or more processors are configured to estimate a steering angular speed on which a steering angular speed error is based and a current value on which a current error is based.

3. The four-wheel independent steering apparatus according to claim 1, wherein the one or more processors are configured to set a steering angular speed reference value using the actual steering angular speed or a steering angular speed to perform the position control of the steering module.

4. The four-wheel independent steering apparatus according to claim 3, wherein the one or more processors are configured to set a steering angular speed reference value and a current reference value by which an error between a reference value and an actual value is 0.

5. The four-wheel independent steering apparatus according to claim 1, wherein the one or more processors are configured to set a current reference value using an actual current value provided by the sensor or a current value estimated by the load estimator to perform the position control of the steering module.

6. A processor-implemented control method of a four-wheel independent steering apparatus, the control method comprising:
receiving, from a sensor disposed in a steering system in a vehicle, an actual steering angle and an actual steering angular speed of the steering system;
calculating an amount of load based on the actual steering angle and the actual steering angular speed of the steering system;
receiving, from an autonomous driving controller that is an upper-level controller, a steering angle reference;
performing position control of the steering module to control the actual steering angle to track the steering angle reference based on the amount of load;
calculating a control current of the vehicle to be applied to the steering module or a voltage value corresponding to the control current from the amount of load and outputting the calculated control current or voltage value to the steering module;
when the sensor fails to provide the actual steering angle and the actual steering angular speed of the steering system, estimating the actual steering angle and the actual steering angular speed of the steering system by applying a gain to a previously calculated actual steering angle and actual steering angular speed of the steering system; and
calculating the amount of load based on the estimated actual steering angle and the estimated actual steering angular speed.

7. The processor-implemented control method according to claim 6, further comprising, estimating a steering angular speed on which a steering angular speed error is based and a current value on which a current error is based.

8. The processor-implemented control method according to claim 6, further comprising setting a steering angular speed reference value using the actual steering angular speed fed back by the sensor or a steering angular speed to perform the position control of the steering module.

9. The processor-implemented control method according to claim 8, wherein setting the steering angular speed reference value or the current reference value further comprises:
setting the steering angular speed reference value and the current reference value to an error between a reference value and an actual value is 0.

10. The processor-implemented control method according to claim 6, further comprising setting a current reference value using an actual current value fed back by the sensor or a current value to perform the position control of the steering module.

* * * * *